(No Model.)
C. EICKEMEYER.
BICYCLE.
No. 591,227. Patented Oct. 5, 1897.
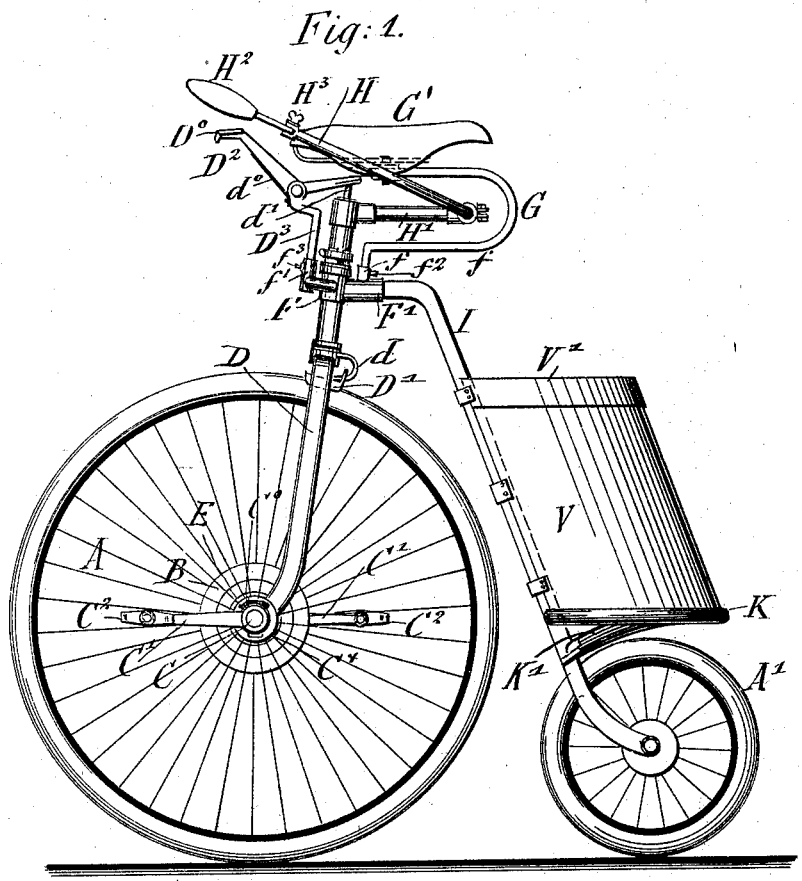
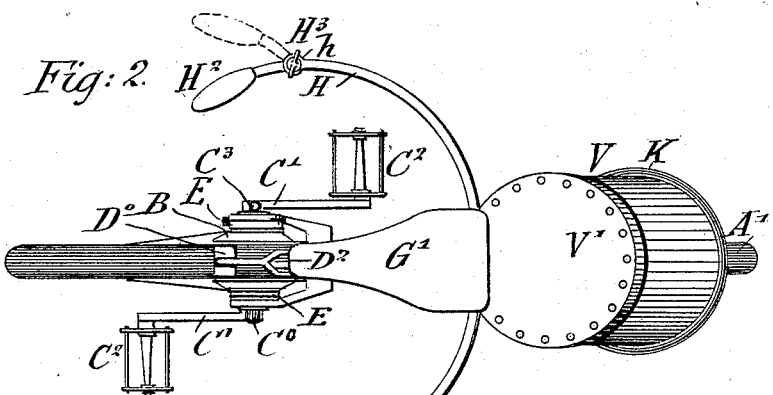
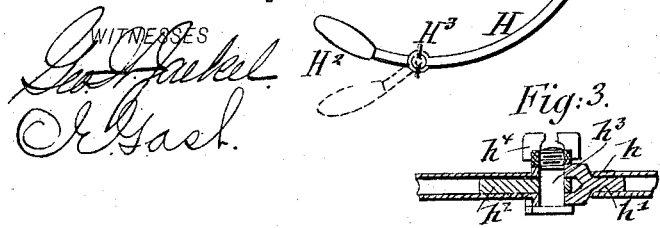
WITNESSES
INVENTOR
Carl Eickemeyer
BY
ATTORNEYS.

UNITED STATES PATENT OFFICE.

CARL EICKEMEYER, OF YONKERS, NEW YORK.

BICYCLE.

SPECIFICATION forming part of Letters Patent No. 591,227, dated October 5, 1897.

Application filed November 12, 1896. Serial No. 611,821. (No model.)

*To all whom it may concern:*

Be it known that I, CARL EICKEMEYER, a citizen of the United States, residing in the city of Yonkers, in the county of Westchester, in the State of New York, have invented some new and useful Improvements in Bicycles, of which the following is a specification.

This invention relates to an improved construction of bicycles which is intended for use as a tourist-bicycle, in which a valise or other receptacle is arranged on a bracket on the main tube or backbone of the bicycle and in which the head-bearing for the spindle of the front fork carries standards for the seat-supporting rod and for the brake-rod, and in which the handle-bar is supported on a horizontal tube extending rearwardly from the front spindle, the handle-bar extending in forward direction at both sides of the front spindle and provided with adjustable handles.

The invention consists of certain details of construction and combinations of parts, which will be fully described hereinafter, and finally pointed out in the claims.

In the accompanying drawings, Figure 1 represents a side elevation of my improved bicycle. Fig. 2 is a plan view of the same, and Fig. 3 is a detail section of the clamp for adjusting the handles on the handle-bars.

Similar letters of reference indicate the same parts.

Referring to the drawings, A represents the main front wheel of my improved bicycle, which is provided with a pneumatic tire and a box-shaped hub B, in which is inclosed a suitable multiple gearing that is used in transmitting the power from the crank-shaft C to the hub B. The crank-shaft C carries cranks C', to the ends of which are applied the pedals $C^2$. The cranks C' are each attached to the crank-shaft C by a pin $C^3$, one end of one of which is flattened at the head and knurled at $C^0$, so as to be used as a step for the foot when mounting the bicycle. Each pin $C^3$ is tightened by a nut $C^4$.

To the lower ends of the front fork D are rigidly fastened by suitable bolts ring-shaped pieces E E, which serve as bearing-surfaces for the antifriction-balls of both wheel-hub B and the crank-shaft C. To the upper part or crown of the front fork D is attached a forked spring $d$, which exerts a lifting action on the brake-shoe D', the forked end of the spring engaging the brake-rod $d'$, which passes through the hollow spindle of the front fork and is acted upon at its upper end by a brake-lever $D^2$, that is fulcrumed to a standard $D^3$, which is attached into a socket of the head-bearing F for the spindle of the front fork. The forward end of the brake-lever $D^2$ is provided with a suitable handle $D^0$, that is located in front of the seat G', said brake-lever being actuated by a flat spring $d^0$, that is attached to the supporting-standard $D^3$ and extends along the under side of the front arm of the brake-lever, as shown in Fig. 1.

The special construction of the brake device forms the subject-matter of a separate application filed herewith and does not require detailed illustration herein, as it is more fully shown and described in said application.

The spindle of the front fork D is supported in a bearing F, which is provided with sockets $f f'$, in which are supported by set-screws $f^2 f^3$, respectively, the U-shaped seat-supporting rod G and the standard $D^3$ for the brake-lever. The U-shaped seat-supporting rod has a certain action in the nature of a spring, independent of the seat, owing to its peculiar shape, it being made in U shape for the purpose of extending to the rear of the handle-bar H, which is clamped to a socket at the end of a horizontal rearwardly-extending tube H', attached to a socket at the upper end of the spindle of the front fork, as shown in Fig. 1. The seat-supporting rod carries the seat G' of any approved construction. The handle-bar H extends over the rear end of the horizontal tube H' in a curve in forward direction and carries the handles $H^2$, which are connected by a clamping-joint $H^3$ with the handle-bar H, so as to be set at any suitable angle to same, as shown in dotted lines in Fig. 2.

The construction of the handle-joint is clearly shown in detail in Fig. 3, and each consists of a socket $h$ at each end of the handle-bar, in which the shank of a forked eyepiece $h'$ is inserted, into which an eye $h^2$, attached at the inner end of the shank of the handle, is set. The forked eyepiece $h'$ and the eye $h^2$ being connected by a screw-bolt $h$ and thumb-nut $h^4$ the handles can be adjusted at any suitable angle to the handle-bars as desired by the rider.

The head-bearing F of the spindle of the front fork is provided with a short rearwardly-extending socket F', into which is inserted the upper end of an angular downwardly-extending tube or backbone I, which is forked at the lower end for the smaller rear wheel A'. The lower end of the wheel-fork is provided with bearings for the axle of the rear wheel. Above the rear wheel A' is arranged a bracket K, which is formed of a circle or ring of tubing, and a central bracket-tube K', that extends from the backbone to the outer rear part of the circular bracket K.

To the horizontal bracket K is attached a valise V, bag, or other receptacle, which is preferably made of sole-leather or other suitable material and which is arranged parallel to the backbone I and provided with a suitable cover V'. In place of the valise or other receptacle a child's seat, basket, or other device for carrying articles may be arranged.

My improved bicycle is mounted from the front by stepping with the left foot on the knurled rest $C^0$ at one side of the front fork and then raising up onto the seat by simultaneously grasping the handles. As the front wheel is equal in size to the wheel of an ordinary safety-bicycle and the crank-axle only fourteen inches from the ground, the bicycle can be mounted with little difficulty. The relative position of the rider to the crank is the same as in ordinary bicycles provided with sprocket-wheels and chain.

The advantages of my improved bicycle are:

First. Simplicity and lightness of its construction.

Second. The power is transmitted directly from the crank-axle to the wheel-hub without the use of a chain-and-sprocket transmission.

Third. As the handle-bars are not arranged in front of the rider he can readily step off from the machine the same way as he mounted, being free from contact with the handle-bars.

Fourth. The center of gravity of the rider is over the front wheel. Hence the machine can be as easily balanced as the high-wheel bicycles heretofore in use.

Fifth. The location of the valise at the rear part of the bicycle prevents it from interfering whenever mounting and dismounting from the bicycle, so that the valise does not interfere with the regular working of the machine.

Sixth. The adjustment of the handles permits them to be placed in any desired position as required by the rider.

Seventh. As the handle-bar is used more for hill-climbing than for steering the machine, it can be easily guided by the use of the pedals.

Eighth. The seat-standard, brake-lever, standard, and handle-bar standard can be adjusted higher or lower, which readily adapts the machine to riders of different size without requiring a large number of different sizes of machines.

Having thus described my invention, I claim as new and desire to secure by Letters Patent—

1. In a bicycle, the combination, with the steering-spindle, of the upright head-bearing for said spindle, a handle-bar, means for connecting the handle-bar at its mid-length with a rearwardly-extending portion of the steering-spindle, said handle-bar extending in forward direction, a U-shaped, seat-supporting rod supported at its lower end on the frame of the machine, said rearwardly-extending portion of the steering-spindle extending into the U-shaped seat-supporting rod so that the latter extends around and above the handle-bar, and a seat arranged on the upper end of the supporting-rod, substantially as set forth.

2. In a bicycle, the combination, with the spindle of the front fork and the front wheel mounted in the front fork, of the upright head-bearing for said spindle, a rearwardly-extending tube at the upper end of said spindle, a handle-bar, means for fastening and securing the handle-bar at its mid-length to the rear end of said tube, said handle-bar extending in forward direction, a U-shaped seat-supporting rod supported by its lower end from the bearing of the front-fork spindle, said rearwardly-extending tube extending into the U portion of the supporting-rod so that the latter extends around and above the handle-bar, and a seat arranged on the upper end of the supporting-rod above said rearwardly-extending tube and the spindle of the front fork, substantially as set forth.

In testimony that I claim the foregoing as my invention I have signed my name in presence of two subscribing witnesses.

CARL EICKEMEYER.

Witnesses:
 HENRY OSTERHELD,
 O. B. WARING.